(12) United States Patent
Sawafuji et al.

(10) Patent No.: US 9,742,743 B2
(45) Date of Patent: Aug. 22, 2017

(54) INFORMATION PROCESSING APPARATUS AND MOBILE TERMINAL DEVICE

(71) Applicant: NS SOLUTIONS CORPORATION, Tokyo (JP)

(72) Inventors: Munehiko Sawafuji, Tokyo (JP); Yasuhiro Okada, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 14/769,774

(22) PCT Filed: Feb. 21, 2014

(86) PCT No.: PCT/JP2014/054120
§ 371 (c)(1),
(2) Date: Aug. 21, 2015

(87) PCT Pub. No.: WO2014/129570
PCT Pub. Date: Aug. 28, 2014

(65) Prior Publication Data
US 2016/0006708 A1    Jan. 7, 2016

(30) Foreign Application Priority Data

Feb. 21, 2013 (JP) .................................. 2013-032396
Feb. 17, 2014 (JP) .................................. 2014-027675

(51) Int. Cl.
| | | |
|---|---|---|
| G06F 21/00 | (2013.01) | |
| H04L 29/06 | (2006.01) | |
| H04L 9/08 | (2006.01) | |
| G06F 21/60 | (2013.01) | |

(52) U.S. Cl.
CPC .......... *H04L 63/0471* (2013.01); *G06F 21/60* (2013.01); *H04L 9/0894* (2013.01); *H04L 63/0428* (2013.01); *H04L 63/0876* (2013.01)

(58) Field of Classification Search
USPC .................................................. 713/160, 190
See application file for complete search history.

(56) References Cited

U.S. PATENT DOCUMENTS

| | | |
|---|---|---|
| 6,711,594 B2 | 3/2004 | Yano et al. |
| 8,074,068 B2 | 12/2011 | Fujii et al. |
| 2002/0138504 A1* | 9/2002 | Yano ................... G06F 11/1464 |

(Continued)

FOREIGN PATENT DOCUMENTS

| | | |
|---|---|---|
| JP | 2002-278970 A | 9/2002 |
| JP | 2007-122446 A | 5/2007 |

(Continued)

OTHER PUBLICATIONS

International Search Report of PCT/JP2014/054120 dated Mar. 18, 2014.

(Continued)

*Primary Examiner* — Jason Lee
(74) *Attorney, Agent, or Firm* — Arent Fox LLP

(57) ABSTRACT

A management server (110) encrypts storage target data and transmits the encrypted storage target data to mobile terminals (120a, 120b). Thereafter, the management server (110) receives and decrypts the encrypted storage target data stored in the mobile terminals (120a, 120b).

11 Claims, 10 Drawing Sheets

(56) References Cited

U.S. PATENT DOCUMENTS

| | | | | |
|---|---|---|---|---|
| 2009/0144543 A1* | 6/2009 | Fujii | ............... | H04L 9/085 |
| | | | | 713/160 |
| 2010/0248698 A1 | 9/2010 | In et al. | | |
| 2010/0299313 A1* | 11/2010 | Orsini | ............... | H04L 9/085 |
| | | | | 707/652 |
| 2013/0035118 A1* | 2/2013 | Hamano | ............... | H04W 4/021 |
| | | | | 455/456.6 |

FOREIGN PATENT DOCUMENTS

| | | |
|---|---|---|
| JP | 2009-010531 A | 1/2009 |
| JP | 2010-231759 A | 10/2010 |
| WO | WO 01/46808 A1 | 6/2001 |
| WO | WO 2007/011164 A1 | 1/2007 |

OTHER PUBLICATIONS

Takashi Matsumoto, "The Network RAID System Exploiting Mechanisms in NIC.", IPSJ SIG Notes, Aug. 5, 2000 (Aug. 5, 2000), vol. 2000, No. 74, pp. 79 to 84.

Kannan, S., et al., "VStore++: Virtual Storage Services for Mobile Devices", International Workshop on Mobile Computing and Clouds (MobiCloud2010), Center for Experimental Research in Computer Systems, Georgia Institute of Technology, Oct. 28, 2010.

Singapore Office Action of related Singapore Patent Application No. 11201506657V dated Sep. 7, 2016.

* cited by examiner

F I G. 8

| M(0,0)=あ | M(0,1)=か | ... | M(0,6)=ま | M(0,7)=や | M(0,8)=ら | M(0,9)=わ | M(0,10)=ん |
| M(1,0)=い | M(1,1)=き | ... | M(1,6)=み | M(1,7)=BLANK | M(1,8)=り | M(1,9)=BLANK | M(1,10)=BLANK |
| M(2,0)=う | M(2,1)=く | ... | M(2,6)=む | M(2,7)=ゆ | M(2,8)=る | M(2,9)=BLANK | M(2,10)=BLANK |
| M(3,0)=え | M(3,1)=け | ... | M(3,6)=め | M(3,7)=BLANK | M(3,8)=れ | M(3,9)=BLANK | M(3,10)=BLANK |
| M(4,0)=お | M(4,1)=こ | ... | M(4,6)=も | M(4,7)=よ | M(4,8)=ろ | M(4,9)=を | M(4,10)=BLANK |

FIG. 9

| | A | B | C | ... | J | K |
|---|---|---|---|---|---|---|
| 1 | A | F | K | ... | t | y |
| 2 | B | G | L | ... | u | z |
| 3 | C | H | M | ... | v | BLANK |
| 4 | D | I | N | ... | w | BLANK |
| 5 | E | J | O | ... | x | BLANK |

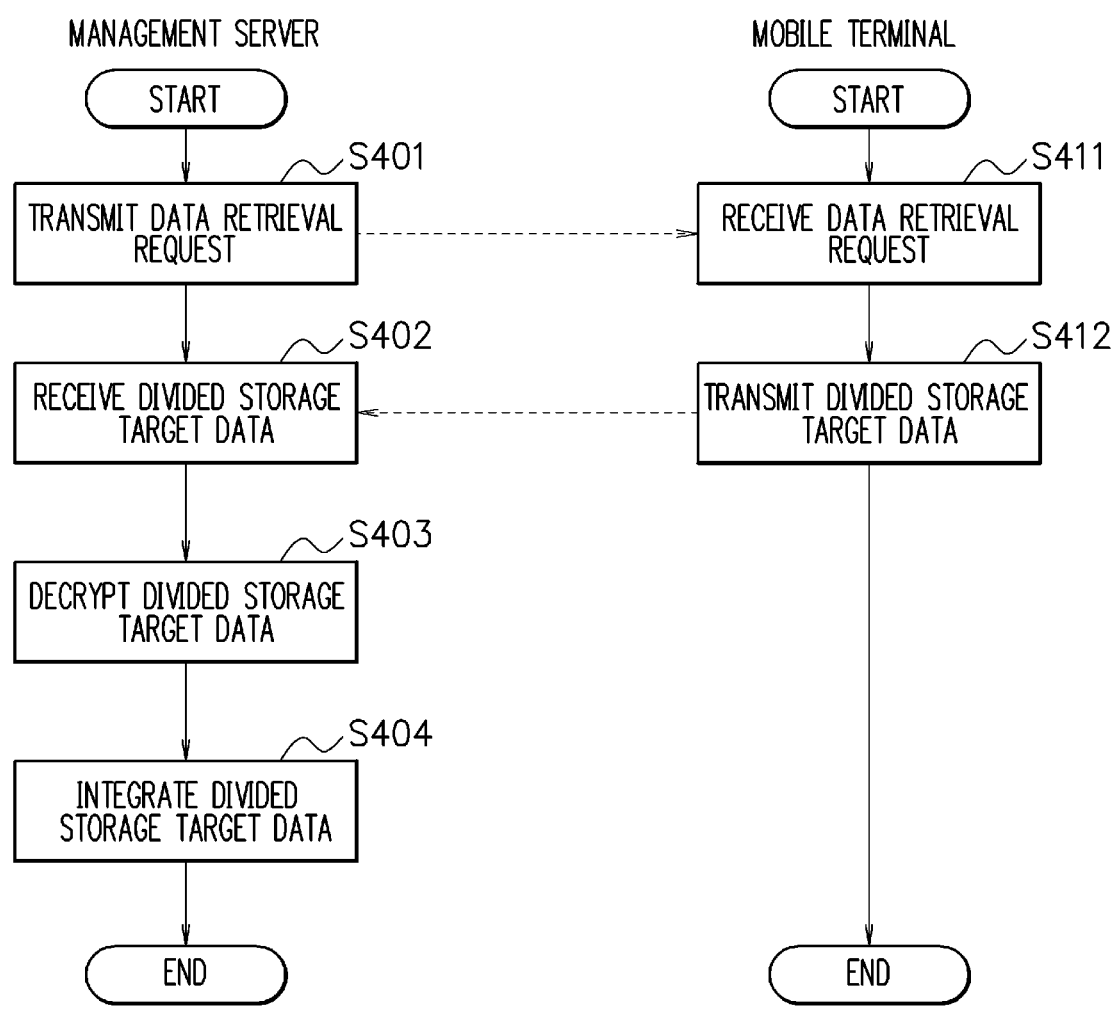
F I G. 10

INFORMATION PROCESSING APPARATUS AND MOBILE TERMINAL DEVICE

CROSS-REFERENCE TO RELATED APPLICATION

This application is a National Stage entry of International Application No. PCT/JP2014/054120, filed Feb. 21, 2014, which claims priority to Japanese Patent Application No. 2014-027675, filed Feb. 17, 2014 and Japanese Patent Application No. 2013-032396, filed Feb. 21, 2013. The disclosures of the priority applications are incorporated in their entirety herein by reference.

TECHNICAL FIELD

The present invention relates to an art for realizing a virtual storage using mobile terminal devices.

BACKGROUND ART

Conventionally, data center business which installs a server in a data center and lends storage areas of the server to enterprises and so on has been deployed. Having high-level security and disaster countermeasure, the data center is capable of storing data safely. However, to install the data center, enormous cost is required for preparing land where to build the data center, constructing a building, securing a power source, purchasing equipment such as the server, and so on, which has been a great burden.

Further, virtualization technology which connects resources of distributed computers already existing in the society via a network and virtually uses a vacant resource as if it is one computer system is also in widespread use.

In recent years, mobile terminals have rapidly come into use, and in the mobile terminals, their communication speed, the speed and the number of cores of CPU, and the capacity of their resources have been increasing more and more. These resources all are not always used, and a ratio of utilization and a frequency of use of the mobile terminal differ depending on each owner, and the ratio of utilization of even the same mobile terminal by the owner greatly differs depending on each time zone. Preferably, these resources are effectively used, if possible. Patent Literature 1 discloses virtualization technology using mobile terminals.

CITATION LIST

Patent Literature

Patent Literature 1: Japanese Laid-open Patent Publication No. 2010-231759

SUMMARY OF INVENTION

Technical Problem

However, the art disclosed in Patent Literature 1 has the following problems. Firstly, no consideration is given to security, which has a risk of information leakage from the mobile terminals. Secondly, being wireless communication, the communication of the mobile terminals is not sometimes stable as compared with wired communication, but no consideration is given to redundancy in such a case.

Therefore, it is an object of the present invention to provide a secure virtual storage using mobile terminal devices.

Solution to Problem

An information processing apparatus of the present invention is an information processing apparatus communicably connected to a mobile terminal device, the information processing apparatus including: an encrypting unit to encrypt storage target data; a transmitting unit to transmit the storage target data encrypted by the encrypting unit to the mobile terminal device; a receiving unit to receive the storage target data stored in the mobile terminal device; and a decrypting unit to decrypt the storage target data received by the receiving unit.

Advantageous Effects of Invention

According to the present invention, it is possible to provide a secure virtual storage using mobile terminal devices.

BRIEF DESCRIPTION OF DRAWINGS

FIG. 8 is a chart illustrating an example of a two-dimensional map of each language.
FIG. 9 is a chart illustrating an example of a two-dimensional map of the alphabet.
FIG. 10 is a flowchart illustrating a retrieval process and a restore process in the data storage system.

DESCRIPTION OF EMBODIMENTS

Hereinafter, a suitable embodiment to which the present invention is applied will be described in detail with reference to the attached drawings.

Figure 1:
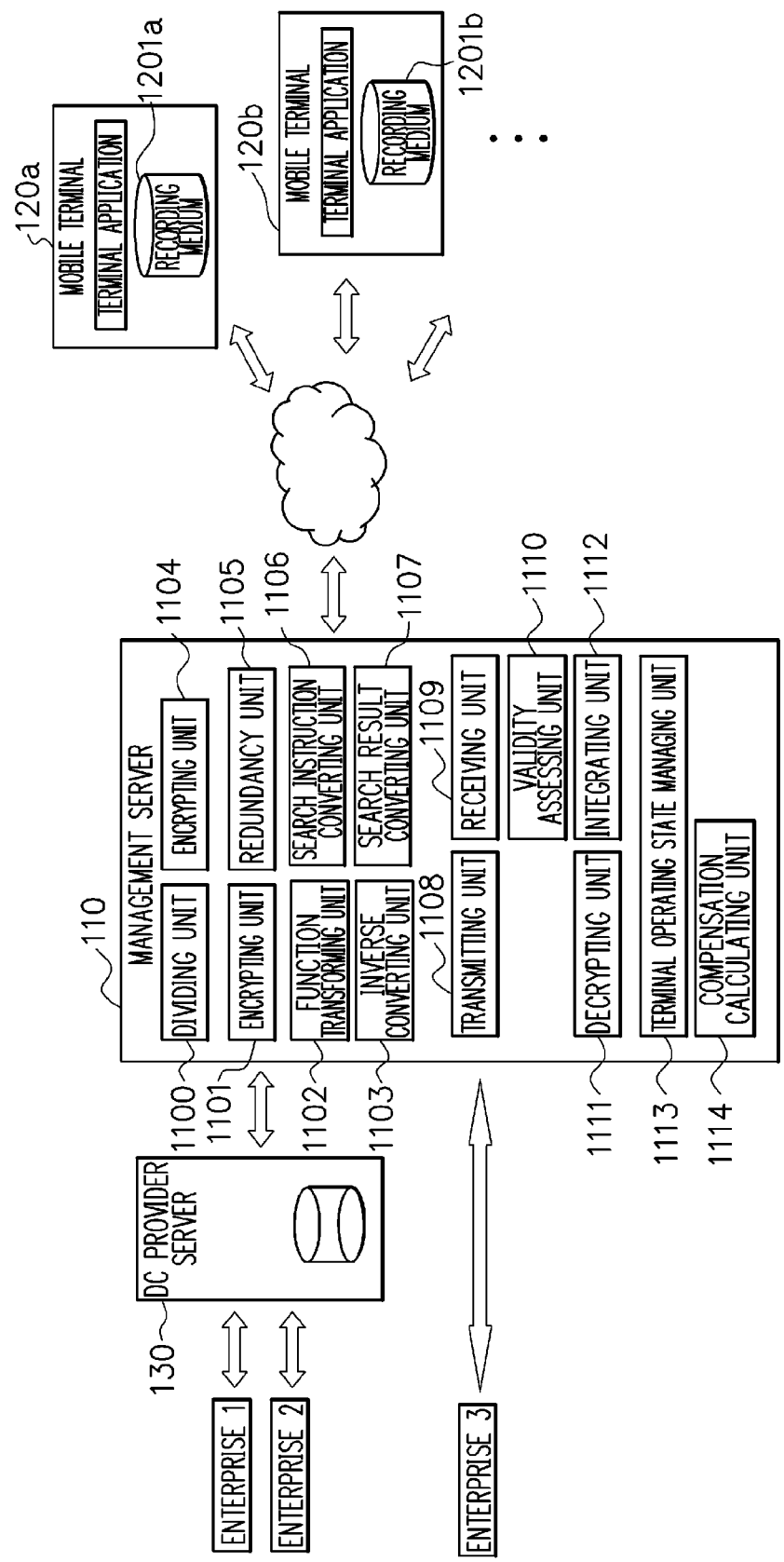
FIG. 1 is a diagram illustrating the configuration of a data storage system.

FIG. 1 is a diagram illustrating the configuration of a data storage system according to the embodiment of the present invention. As illustrated in FIG. 1, the data storage system according to this embodiment includes: a management server 110 for managing and controlling the data storage system; a plurality of mobile terminals 120 (120a, 120b, . . . ) owned by, for example, general users; and a DC provider server 130 installed in a data center (DC) provider side. The management server 110 and the DC provider server 130 are connected via a dedicated network, the Internet, or the like, and the management server 110 and the mobile terminals 120 are connected via the Internet and wireless communication lines. The management server 110 causes recording mediums 1201 of the plural mobile terminals 120 distributed in the society to store data of enterprises received via the DC provider server 130 or data received directly from enterprises. Incidentally, concrete examples of the mobile terminals 120 can be a mobile telephone, a Smartphone, a tablet terminal, an on-vehicle terminal, a notebook PC, and so on. Further, in FIG. 1, only the mobile terminals 120 are illustrated as storage destinations of the data, but a fixedly installed PC may be included as the storage destination of the data.

The management server 110 includes a dividing unit 1100, an encrypting unit 1101, a function transforming unit 1102, an inverse converting unit 1103, an encrypting unit 1104, a redundancy unit 1105, a search instruction converting unit 1106, a search result converting unit 1107, a transmitting unit 1108, a receiving unit 1109, a validity assessing unit 1110, a decrypting unit 1111, an integrating unit 1112, a terminal operating state managing unit 1113, and a compensation calculating unit 1114. The dividing unit 1100 generates a plurality of divided storage target data by dividing the data being a storage target (hereinafter, referred to as storage target data).

The dividing unit 1100, the encrypting unit 1101, the function transforming unit 1102, the inverse converting unit 1103, the transmitting unit 1108, and the receiving unit 1109 are structures which function when a processing target is numeric data. Further, the dividing unit 1100, the encrypting unit 1104, the redundancy unit 1105, the search instruction converting unit 1106, the search result converting unit 1107, the transmitting unit 1108, and the receiving unit 1109 are structures which function when a processing target is character string data.

The structures which function when the processing target is the numeric data will be described. The dividing unit 1100 divides the numeric data (original data) being the processing target into a plurality of data units (first numeric data). The encrypting unit 1101 encrypts the first numeric data obtained by the division by using an encryption function. Consequently, a plurality of second numeric data which have been encrypted are generated. The function transforming unit 1102 transforms an arithmetic function (first arithmetic function) of the first numeric data into an arithmetic function (second arithmetic function) of the second numeric data. The transmitting unit 1108 transmits, to the mobile terminals 120, the encrypted second numeric data and an operation instruction to the effect that the second numeric data be operated by the second arithmetic function. The receiving unit 1109 receives, from each of the terminals 120, a result of the arithmetic operation of the second numeric data by the second arithmetic function. The inverse converting unit 1103 inversely converts the arithmetic result by using an inverse function of the encryption function to thereby obtain a result of an arithmetic operation of the first numeric data by the first arithmetic function.

Next, the structures which function when the processing target is the character string data will be described. The dividing unit 1100 divides the character string data (original data) being the processing target into a plurality of data units (first character string data). The encrypting unit 1104 encrypts characters of the character string data (first character string data) being the processing target obtained by the division, one by one. Consequently, encrypted second character string data are generated. The redundancy unit 1105 adds character data at specific positions of the second character string data to thereby generate third character string data. The added character data are preferably created from a character set having such a character appearance frequency that makes it difficult for an appearance frequency analysis to infer the first character string data from the third character string data. The search instruction converting unit 1106 converts a search instruction in the first character string data into a search instruction in the second character string data, and further converts the search instruction in the second character string data into a search instruction in the third character string data. The transmitting unit 1108 transmits the third character string data and the search instruction in the third character string data to the mobile terminals 120. The receiving unit 1109 receives, from each of the mobile terminals 120, a search result in the third character string data. The search result converting unit 1107 eliminates a search result stemming from a character of a redundant part from the search result in the third character string data to thereby obtain a search result in the first character data for a first search character string.

Incidentally, as for each of the encrypted divided storage target data, the transmitting unit 1108 transmits the same divided storage target data to the plural mobile terminals 120 to make the mobile terminals 120 store the divided storage target data. Incidentally, when the management server 110 tries to retrieve the divided storage target data from the mobile terminal 120, there can occur a situation where the divided storage target data cannot be retrieved because communication between the management server 110 and the mobile terminal 120 is interrupted, a battery in the mobile terminal 120 becomes flat, and so on. To prevent this, in this embodiment, a redundancy process by the transmitting unit 1108 is performed, that is, the same divided storage target data is entrusted to the plural mobile terminals 120. Consequently, even if the divided storage target data cannot be retrieved from a certain one of the mobile terminals 120, the management server 110 of this embodiment is capable of retrieving the same divided storage target data from the other mobile terminal 120.

The decrypting unit 1111 decrypts each of the divided storage target data received (retrieved) by the receiving unit 1109 from the plural mobile terminals 120. The integrating unit 1112 integrates the plural decrypted divided storage target data to thereby restore the storage target data.

Incidentally, when the storage target data is restored by integrating the plural divided storage target data, it is preferable to confirm, on a previous stage, validity of each of the divided storage target data being integration targets, that is, whether or not the divided storage target data are truly generated by dividing the relevant divided storage target data. Therefore, the validity assessing unit 1110 of this embodiment executes a process of assessing the validity of the divided storage target data after receiving (retrieving) the plural divided storage target data. Then, when the validity is confirmed, the management server 110 decrypts the relevant divided storage target data in the decrypting unit 1111 and integrates the divided storage target data in the integrating unit 1112, to thereby restore the storage target data. This makes it possible to accurately restore the original storage target data.

An example of the process of confirming the validity of the divided storage target data is as follows. The management server 110 receives the respective divided storage target data from the plural mobile terminals 120 to which the same divided storage target data is entrusted, and determines whether or not the divided storage target data received first and second are the same. When they are the same, the management server 110 determines that the validity of the relevant divided storage target data has been confirmed and adopts the relevant divided storage target data. On the other hand, when they are not the same, the management server 110 determines whether or not one of the already received divided storage target data is the same as the divided storage target data received third or later. Then, at a point in time when the same divided storage target data is found, the management server 110 determines that the validity of the relevant storage target data has been confirmed and adopts the relevant divided storage target data. Incidentally, the process of assessing the sameness of the divided storage target data is performed by an error detection code technique using a checksum, a hash function, or the like. As an alternative process of assessing the sameness of the divided storage target data, the management server 110 stores a correct value of the checksum or the hash function of the divided storage target data before transmitting the divided storage target data to the mobile terminals 120. Then, the validity assessing unit 1110 may assess the sameness of the divided storage target data by comparing the stored value of the checksum or the hash function and a value of the checksum or the hash function calculated from the divided storage target data received from each of the mobile terminals 120.

The terminal operating state managing unit 1113 obtains operating state information including a communication state (communication speed, a network connection time per day, and so on), a battery charge state, a vacant capacity of the recording medium 1201, and a load of CPU from each of the mobile terminals 120. Then, the terminal operating state managing unit 1113 selects the mobile terminal 120 satisfying a condition as the storage destination of the divided storage target data, based on the obtained operating state information. For example, the mobile terminal 120 satisfying all the conditions that the communication speed is equal to or higher than a predetermined speed, the network connection time per day is equal to or longer than a predetermined time, the battery charge state and the vacant capacity of the recording medium 1201 are predetermined ratios (or predetermined values) or more, and the load of the CPU is less than a predetermined value is selected as the storage destination of the divided storage target data. The management server 110 transmits the divided storage target data to the mobile terminal selected by the terminal operating state managing unit 1113 to make the selected mobile terminal store the divided storage target data. Note that the aforesaid "vacant capacity of the recording medium 1201" means a vacant capacity usable by the data storage system, out of the total vacant capacity of the recoding medium 1201. An alternative way may be that the owner of the mobile terminal 120 sets conditions for providing a resource (the resource is provided only during a day of a week or a time zone when to provide the resource or during the charging of the battery, the resource is provided when the battery remaining capacity is equal to or more than the predetermined value, the resource is provided when the vacant capacity of the recording medium 1201 is equal to or more than the predetermined value, or the like) in advance in the mobile terminal 120, and the terminal operating state managing unit 1113 obtains the condition for providing the resource and reflects the condition for providing the resource when selecting the storage destination of the divided storage target data.

The compensation calculating unit 1114 calculates a compensation that a provider of the vacant capacity of the recording medium 1201 of the mobile terminal 120 should receive. An example of the compensation calculating method is a method in which the compensation is calculated according to an actually used capacity of the recording medium 1201. Other examples are a method in which a predetermined capacity of the recording medium 1201 is purchased at a fixed price and the fixed price is set as the compensation by, for example, month, and so on.

Figure 2:
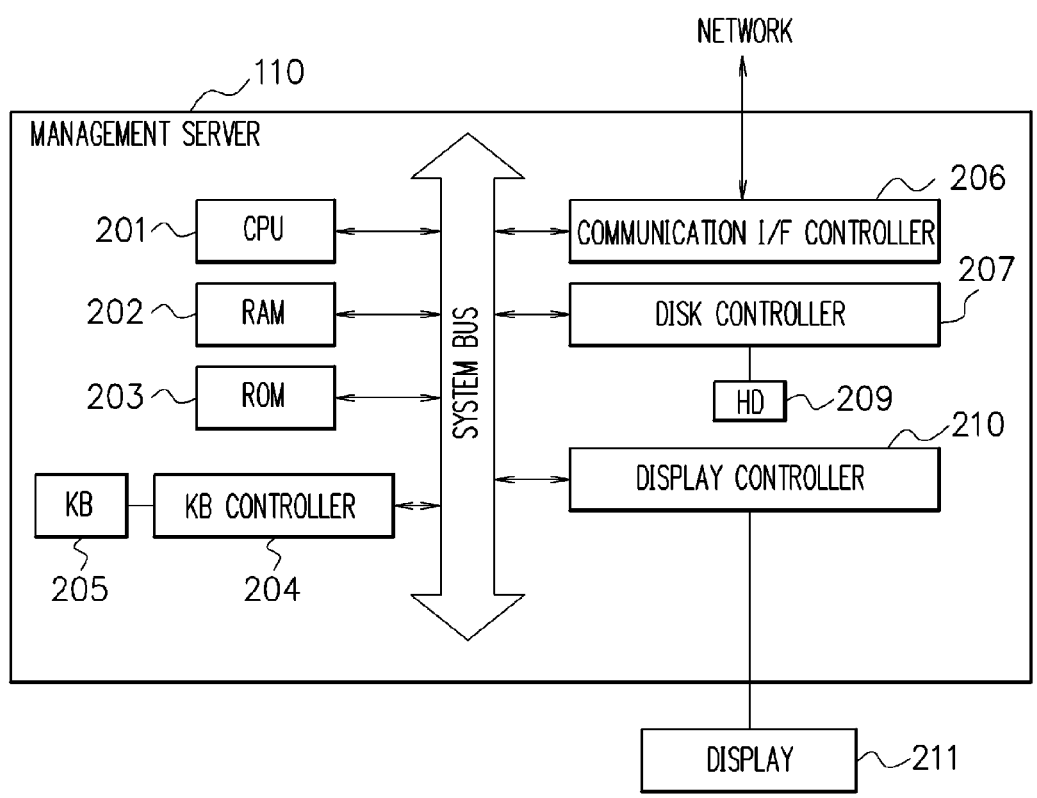
FIG. 2 is a diagram illustrating a hardware configuration of a management server.

FIG. 2 is a diagram illustrating a hardware configuration of the management server 110 in this embodiment. In FIG. 2, a CPU 201 centrally controls devices and controllers connected to a system bus. In a ROM 203 or a HD (hard disk) 209, BIOS (Basis Input/Output System) being a control program of the CPU 201, an operating system program, a program of processes illustrated in, for example, Steps S101 to S103 in FIG. 3, Steps S201 to S206 in FIG. 6, Steps S301 to S308 in FIG. 7, Steps S401 to S404 in FIG. 10, and Steps S501 to S506 in FIG. 11 which are executed by the management server 110 are stored.

Incidentally, in the configuration in the example in FIG. 2, the HD 209 is disposed inside the management server 110, but as another embodiment, a structure corresponding to the HD 209 (for example, a DB server or an external storage device) may be disposed outside the management server 110. Further, the program for executing the processes according to this embodiment may be recorded in a computer-readable recording medium such as CD-ROM to be supplied from the recording medium, or may be supplied via a communication medium such as the Internet.

A RAM 202 functions as a main memory, a work area, and so on of the CPU 201. The CPU 201 loads a necessary program and so on to the RAM 202 when executing the processing and realizes various kinds of operations by executing the program.

The HD 209 functions as an external memory. The CPU 201 loads a necessary program and so on to the RAM 202 when executing the processing and realizes various kinds of operations by executing the program.

A disk controller 207 controls an access to the external memory such as the HD 209. A communication I/F controller 206 connects to the Internet, WAN, or LAN, and controls communication with the outside by, for example, TCP/IP.

A display controller 210 controls image display on a display 211. A KB controller 204 receives an operation input from a KB (keyboard) 205 to transmit it to the CPU 201. Incidentally, as an operation means of a user, besides the KB 205, a pointing device such as a mouse, which is not illustrated, is also applicable to the management server 110 according to this embodiment.

Note that the structures 1100 to 1114 illustrated in FIG. 1 are structures realized by, for example, the program stored in the HD 209 and loaded to the RAM 202 when necessary and the CPU 201 which executes the program.

A hardware configuration of the mobile terminal 120 is basically the same as that illustrated in FIG. 2, and therefore the illustration thereof will be omitted. The program for executing the processing according to this embodiment may be recorded in a computer-readable recording medium such as ROM in the mobile terminal 120 to be supplied from the recording medium, or may be supplied via a communication medium such as the Internet.

Figure 3:
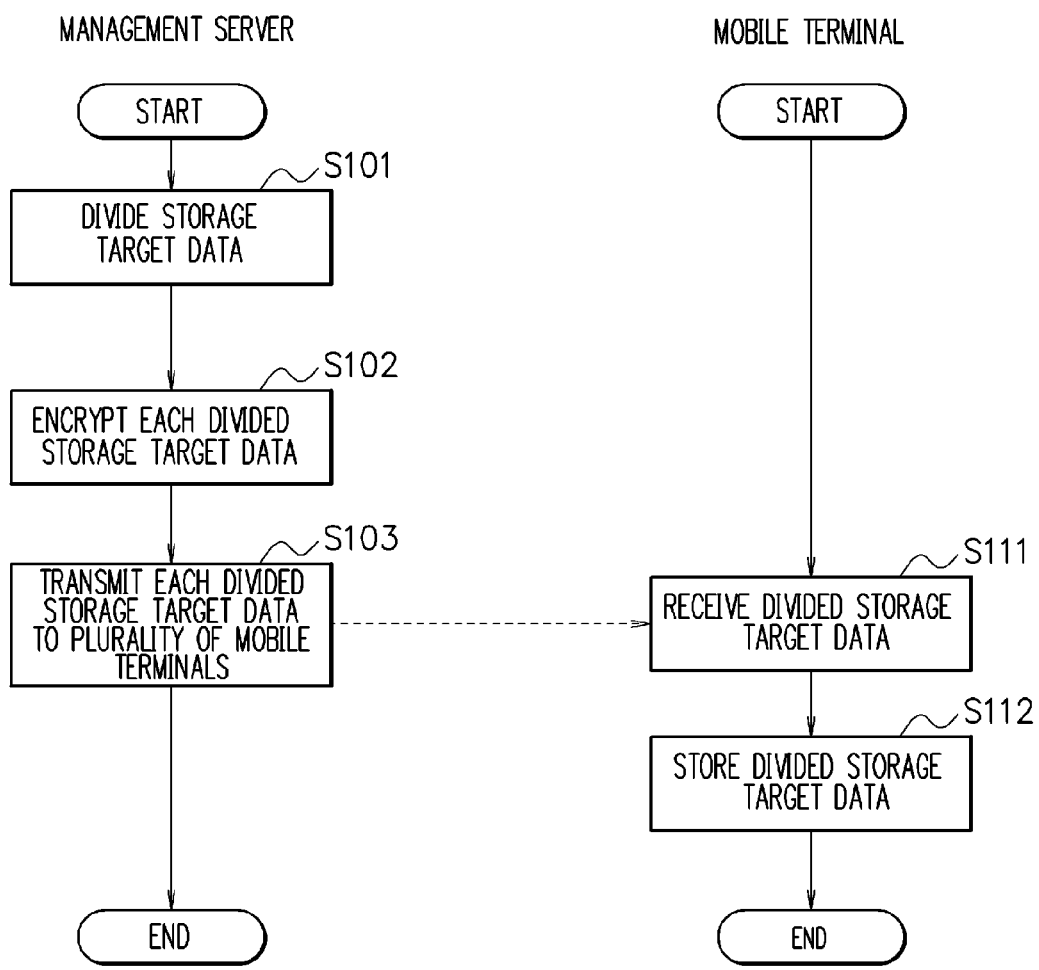
FIG. 3 is a flowchart illustrating a storage process in the data storage system.

Next, a storage process of the storage target data in the data storage system according to this embodiment will be described with reference to FIG. 3.

At Step S101, the dividing unit 1100 of the management server 110 divides the storage target data to generate the plural divided storage target data. At this time, the dividing unit 1100 divides the storage target data so that a ratio of a data volume of the divided storage target data to be stored per mobile terminal 120 to the total data volume of the storage target data becomes a preset data storage threshold value or less. For example, when the data storage threshold value is 5% and the data volume of the storage target data is 1 GB, the dividing unit 1100 divides the storage target data in 50 MB units or less. Further, the dividing unit 1100 may divide the 1 GB storage target data into one hundred data, that is, into the divided storage target data of 10 MB each. In this case, the management server 110 may make the single mobile terminal 120 store five pieces of the divided storage data at the maximum. At Step S102, the encrypting unit 1101 or the encrypting unit 1104 encrypts each of the divided storage target data. By thus dividing the storage target data with predetermined granularity, the whole storage target data is not grasped even if the encryption is broken by a certain one of the mobile terminals 120 because this mobile terminal 120 stores only partial data into which the storage target data is divided with the aforesaid predetermined granularity. Therefore, it is possible to ensure security against stealthy glance of the data by the owner of the mobile terminal 120, a loss of the mobile terminal 120, and the like.

Further, in this embodiment, after the storage target data is divided at Step S101, each of the divided storage target data is encrypted at Step S102, and therefore, even if some of the divided storage target data cannot be retrieved at the time of the integration of the divided storage target data, it is possible to restore the storage target data by decrypting the other divided storage target data that can be retrieved, though partial information is lacking. Further, the order of Steps S101 and S102 may be reversed. In this case, security can be improved because it is not possible to decrypt each of the divided storage target data unless all the divided storage target data can be retrieved.

Figure 4A:
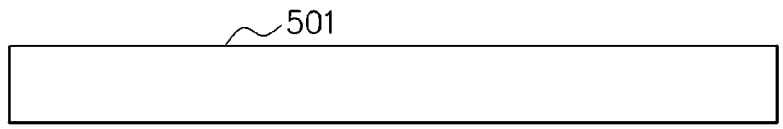
FIG. 4A is an explanatory chart of a division process and an encryption process.
Figure 4B:
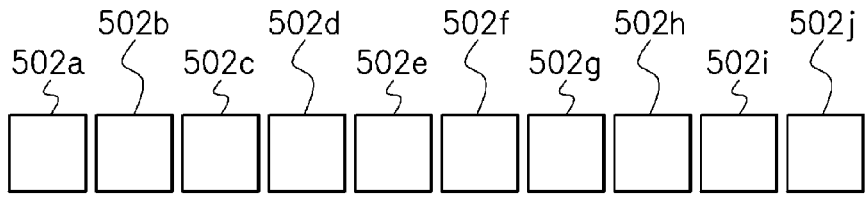
FIG. 4B is an explanatory chart of the division process and the encryption process.
Figure 4C:
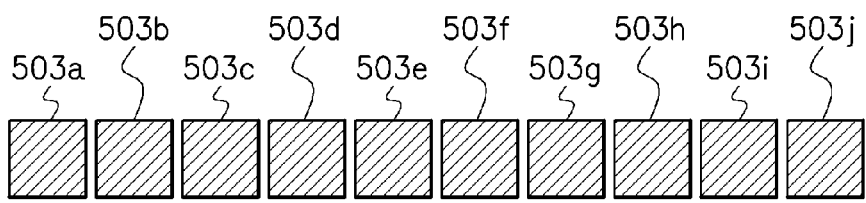
FIG. 4C is an explanatory chart of the division process and the encryption process.

FIG. 4A to FIG. 4C are explanatory charts of the division process of the storage target data at Step S101 and the encryption process of each of the divided storage target data at Step S102. FIG. 4A illustrates storage target data 501. At Step S101, the storage target data 501 is divided (here divided into ten) in the dividing unit 1100, so that 10 divided storage target data 502a to 502j are generated, as illustrated in FIG. 4B. Then, at Step S102, each of the divided storage target data 502a to 502j is encrypted in the encrypting unit 1101 or the encrypting unit 1104, so that ten encrypted divided storage target data 503a to 503j are generated as illustrated in FIG. 4C. Each of the encrypted divided storage target data 503a to 503j is transmitted to the mobile terminals 120 to be stored in the mobile terminals 120.

Here, the granularity when the storage target data is divided will be described in detail. In the below, data with a size small enough to be stored in the recording medium 1201 of the mobile terminal 120 will be defined as "data small in terms of capacity". Further, when the mobile terminal 120 whose communication environment is not very good is tried to be used, it is more advantageous that the data stored per mobile terminal 120 is limited to a size small enough to be sent in a short time, and this limited size will be defined as "data small in terms of communication".

The "data small in terms of capacity" becomes larger according to a capacity of a memory mountable in the mobile terminal 120, and therefore becomes larger according to the Moore's Law of semiconductor. On the other hand, it is thought that the "data small in terms of communication" does not become larger at the pace according to the Moore's Law of semiconductor since, even if a LTD or next generation communicable area expands, an area where only 3G communication is possible can exist outside this area, or people in areas where a communication infrastructure is underdeveloped may have a strong need for earning compensations by providing resources of their mobile terminals. Therefore, even the "data small in terms of capacity" is preferably divided with the granularity of the "data small in terms of communication" so that the data can be completely transmitted within a predetermined time in the worst communication environment.

Figure 5:
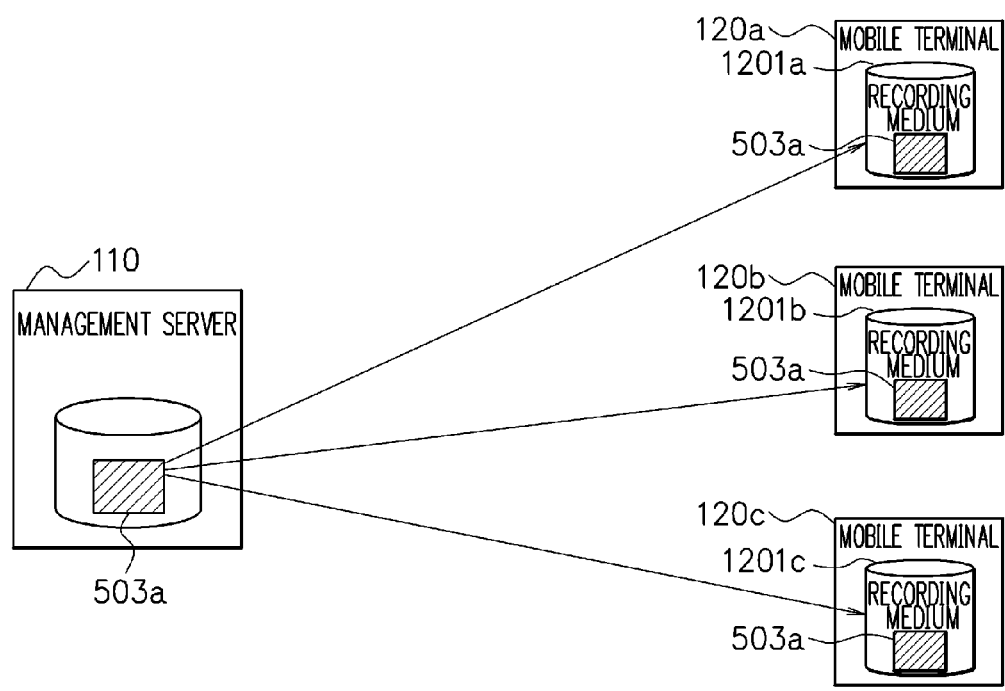
FIG. 5 is an explanatory view of a redundancy process.

At Step S103, as for each of the encrypted divided storage target data, the transmitting unit 1108 transmits the same divided storage target data to the plural mobile terminals 120. FIG. 5 is a view for explaining the redundancy process at Step S103 based on the example illustrated in FIG. 4A to FIG. 4C. As illustrated in FIG. 5, the transmitting unit 1108 transmits the same encrypted divided storage target data (in FIG. 5, only the divided storage target data 503a is illustrated) to the plural mobile terminals 120a to 120c. Consequently, the same encrypted divided storage target data 503a is stored in the plural mobile terminals 120a to 120c. Such a process is executed for all the encrypted divided storage target data 503a to 503j. Incidentally, the same divided storage target data 503a which has been encrypted is stored in the mobile terminals 120a to 120c, but the other encrypted divided storage target data 503b to 503j may be stored in the same mobile terminals 120a to 120c, provided that the data storage threshold value is not exceeded, or may be stored in other plural mobile terminals. In view of security, the latter is more preferable because the divided storage target data is preferably entrusted in a distributed manner as much as possible.

At Step S111, the mobile terminals 120 receive the encrypted divided storage target data from the management server 110. At Step S112, the mobile terminals 120 each store the encrypted divided storage target data in the recording medium 1201.

Figure 6:
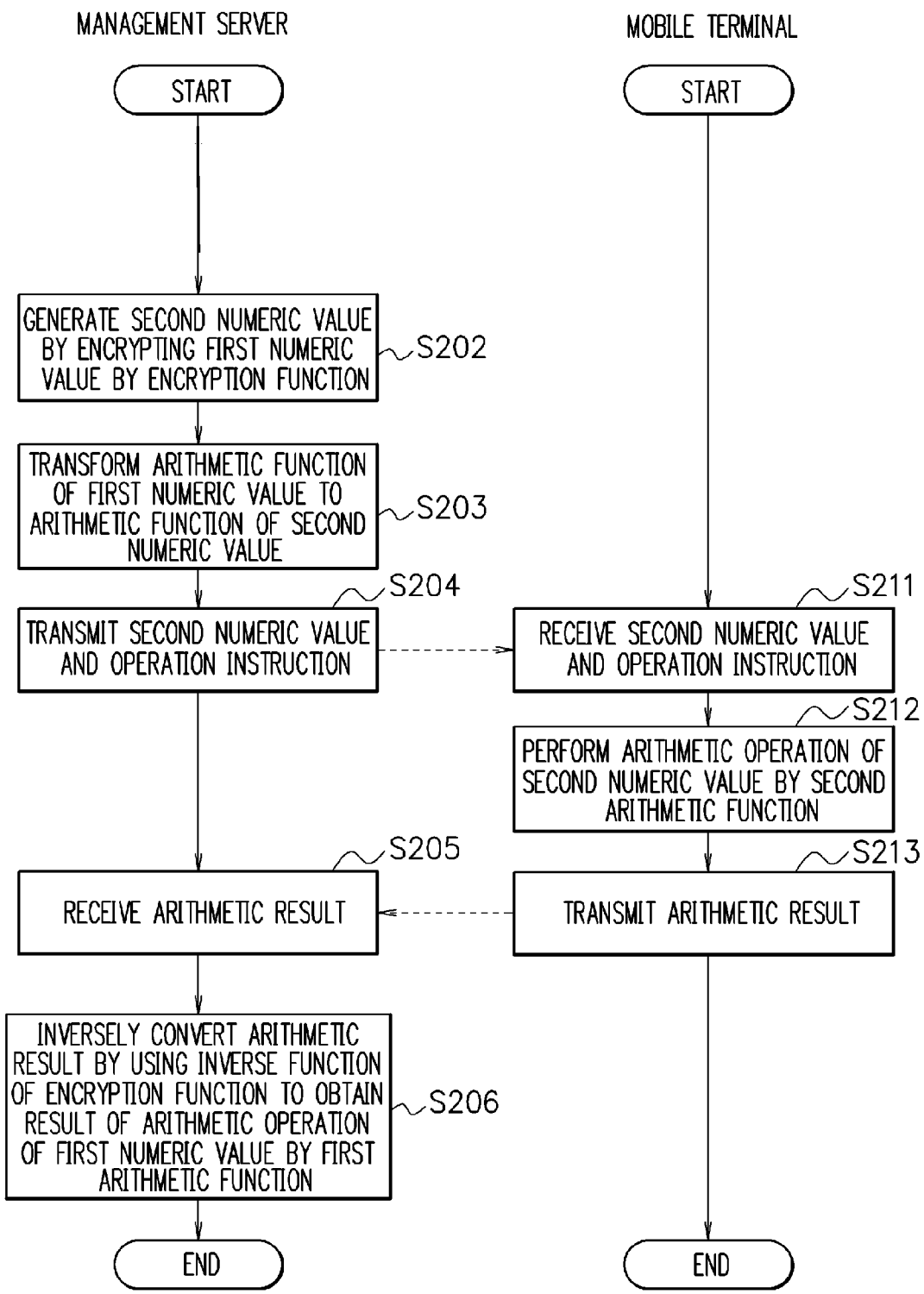
FIG. 6 is a flowchart illustrating the encryption process of numeric data.

Next, the encryption process at Step S102 and so on will be described in more detail with reference to FIG. 6 and FIG. 7. FIG. 6 is a flowchart illustrating the process when a processing target is numeric data. At Step S202, the encrypting unit 1101 encrypts the plural first numeric data generated at Step p S101 by the encryption function to thereby generate the plural second numeric data. Here, the first numeric data and the second numeric data correspond to the divided storage target data not encrypted and the divided storage target data encrypted respectively.

At Step S203, the function transforming unit 1102 transforms the arithmetic function of the first numeric data (first arithmetic function) into the arithmetic function of the second numeric data (second arithmetic function). At Step S204, the transmitting unit 1108 transmits the second numeric data and also the operation instruction to the effect that the second numeric data be operated by the second arithmetic function, to the mobile terminals 120.

At Step S211, the mobile terminals 120 receive the second numeric data and the operation instruction from the management server 110. At Step S212, the mobile terminals 120 each perform the arithmetic operation of the second numeric data by the second arithmetic function according to the operation instruction from the management server 110, to obtain the arithmetic result. At Step S213, the mobile terminals 120 each transmit the arithmetic result to the management server 110.

At Step S205, the receiving unit 1109 receives the arithmetic result from each of the mobile terminals 120. At Step S206, the inverse converting unit 1103 inversely converts the arithmetic result by using the inverse function of the encryption function used at Step S202 to thereby obtain the result of the arithmetic operation of the first numeric data by the first arithmetic function.

Hereinafter, the process illustrated in FIG. 6 will be described by giving first to third concrete examples. First, the first concrete example will be described. In the first concrete example, it is assumed that an encryption function f( ) that keeps the four operations before and after the encryption process as follows is used.

$$f(a*x+b*y)=a*f(x)+b*f(y)$$

The first numeric data and the second numeric data obtained by encrypting the first numeric data by the encryption function are defined as follows.

first numeric data: a, b, x, y
second numeric data: a, b, f(x), f(y)

A first arithmetic function of the first numeric data and a second arithmetic function, which is transformed from the first arithmetic function, of the second numeric data are defined as follows.

first arithmetic function: a*x+b*y
second arithmetic function: a*f(x)+b*f(y)

That is, at Step S204, the second numeric data (a, b, f(x), f(y)) and the operation instruction to the effect that the second numeric data be operated by the second arithmetic function (a*f(x)+b*f(y)) are transmitted from the management server 110 to the mobile terminals 120.

At Step S206, the first arithmetic result (a*f(x)+b*f(y)) is inversely converted by using the inverse function f−1( ) of the encryption function f( ) as follows.

$$f{-}1(a*f(x)+b*f(y))=f{-}1(f(a*x+b*y))=a*x+b*y$$

Consequently, the result of the arithmetic operation of the first numeric data (a, b, x, y) by the first arithmetic function (a*x+b*y) can be obtained.

Next, the second concrete example will be described. In the second concrete example, 99 random numeric data are prepared for certain one of the first numeric data, and an encryption function f( ) including them as components is used. For example, 99 random numeric values s1 to s99 are prepared for the first numeric data x and an encryption function f(x) whose output v is a vector (x, s1, s99) is used. If the four operations of f(x) is defined as the four operations of each of the components, the encryption function f(x) obviously keeps the four operations before and after the encryption process. In this example, an inverse function f−1(v) of the encryption function f(x) is a function for extracting the first component of the second arithmetic result. Incidentally, when it is not desired that the original numeric data (first numeric data) is seen in the mobile terminal 120, for example, the encryption process is performed at Step S202 by using the encryption function f(x) which multiplies the first component of the vector (x, s1, s99) by a constant, and at Step S206, the arithmetic result is inversely converted by using the inverse function f−1(v) that divides the first component of the vector by the constant.

Next, the third concrete example will be described. In the third concrete example, an encryption function f( )=exp( ) is used.

The first numeric data and the second numeric data obtained by encrypting the first numeric data by the encryption function are defined as follows.

first numeric data: a, b, x, y
second numeric data: a, b, f(x)=exp(x), f(y)=exp(y)

The first arithmetic function of the first numeric data and the second arithmetic function, which is transformed from the first arithmetic function, of the second numeric data are defined as follows.

first arithmetic function: a*x+b*y
second arithmetic function: (f(x)^a)*(f(y)^b)

That is, at Step S204, the second numeric data (a, b, f(x)=exp(x), f(y)=exp(y)) and also the operation instruction to the effect that the second numeric data be operated by the second function ((f(x)^a)*(f(y)^b)) are transmitted from the management server 110 to the mobile terminals 120.

At Step S206, by using an inverse function f−1( )=log( ) of the encryption function f( ), the first arithmetic result (f(x)^a)*(f(y)^b)) is inversely converted as follows.

$$f{-}1((f(x)^a)*(f(y)^b))=\log((\exp(x)^a)*(\exp(y)^b))=\log(\exp(a*x+b*y))=a*x+b*y$$

Consequently, the result of the arithmetic operation of the first numeric data (a, b, x, y) by the first arithmetic function (a*x+b*y) can be obtained.

Figure 7:
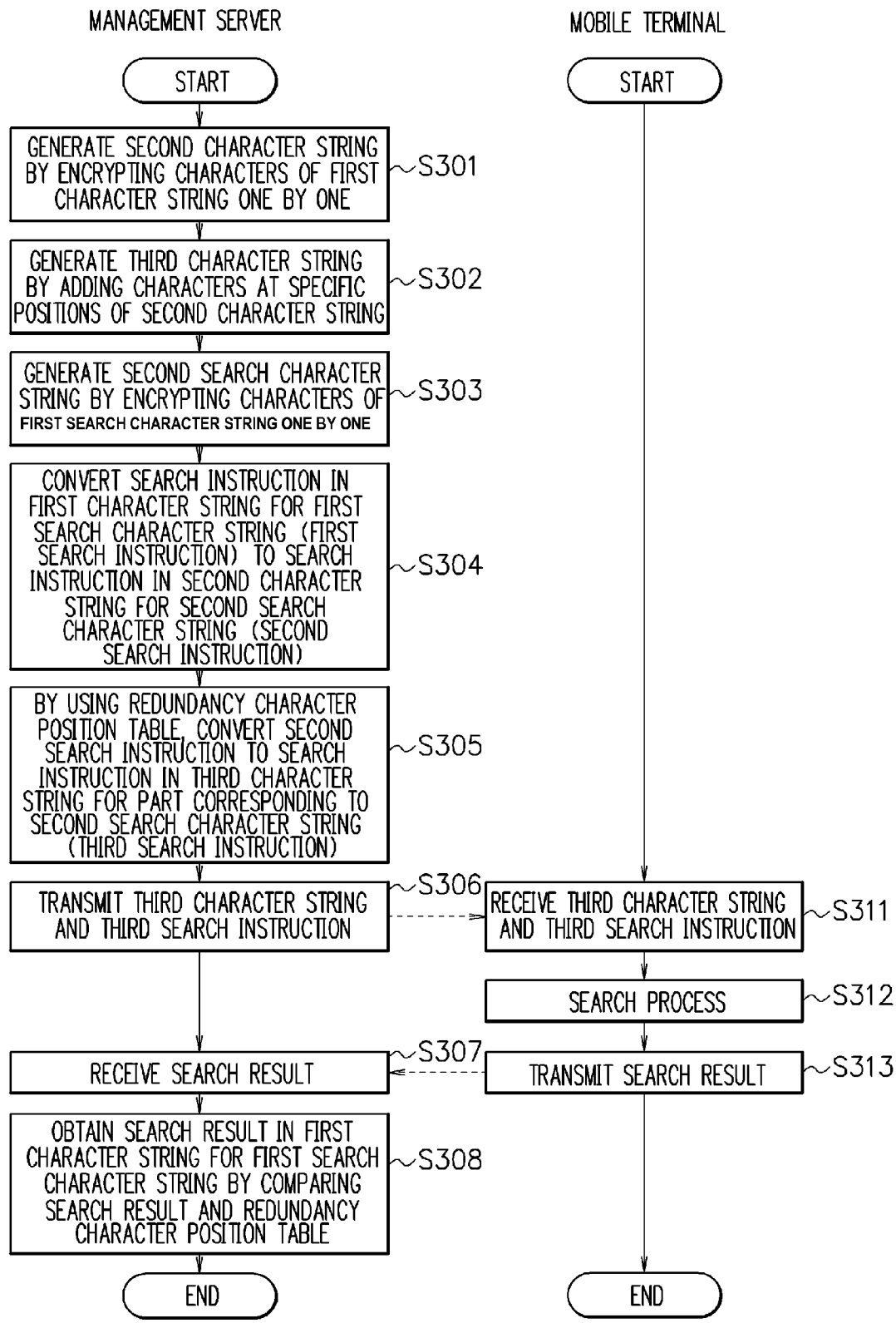
FIG. 7 is a flowchart illustrating the encryption process of character string data.

FIG. 7 is a flowchart illustrating the process when the processing target is character string data. At Step S301, the encrypting unit 1104 encrypts the characters of the first character string data (original data) being the processing target data unit, one by one, to convert the first character string data into the second character string data. At Step S302, the redundancy unit 1105 adds character data at specific positions of the second character string data generated at Step S301, by using a redundancy character position table indicating addition patterns, to thereby generate the third character string data. Here, the first character string data and the third character string data correspond to the divided storage target data not encrypted and the divided storage target data encrypted.

At Step S303, the search instruction converting unit 1106 converts a first search character string being a search target character string into a second search character string by encrypting characters of the first search character string one by one. At Step S304, the search instruction converting unit 106 converts the search instruction in the first character string for the first search character string (first search instruction) into the search instruction in the second character string for the second search character string (second search instruction).

At Step S305, the search instruction converting unit 1106 converts the second search instruction into a search instruction in the third character string for a part corresponding to the second search character string (third search instruction), by using the redundancy character position table. At Step S306, the transmitting unit 1108 transmits the third character string and the third search instruction to the mobile terminals 120.

At Step S311, the mobile terminals 120 receive the third character string and the third search instruction from the management server 110. At Step S312, the mobile terminals 120 search the third character string for the part corresponding to the second search character string, according to the third search instruction. At Step S313, the mobile terminals 120 each transmit the search result obtained at Step S312 to the management server 110.

At Step S307, the receiving unit 1109 receives the search result from each of the mobile terminals 120. At Step S308, the search result converting unit 1107 compares the search result and the redundancy character string position table to eliminate the search result stemming from the character at the redundant part, to thereby obtain the search result in the first character string for the first search character string.

Hereinafter, the process illustrated in FIG. 7 will be described by giving first to fourth concrete examples. The first and second concrete examples are examples of character strings of Japanese language. In the first concrete example, at Step S301, the encrypting unit 1104 encrypts the characters of the first character string data one by one, by shifting each of the characters by one consonant row of the 50-character syllabary of Japanese language, like あ row→ か row, か row→さ row, . . . , to thereby generate the second character string data. Then, at Step S302, the redundancy unit 1105 inserts a false character per character to the second character string data, by using the redundancy character position table, to thereby generate the third character string data. Consequently, in the third character string data, authentic characters are at odd-numbered positions and the false characters are at even-numbered positions. For example, when the first character string data is "あいうえお", the second character string data becomes "かきくけこ". Further, when the first search character string data is "うえ", the second search character string data becomes "くけ". Then, the third character string data obtained by inserting the false character per character to the second character string data becomes, for example, "かくきけくす けせこそ" according to the redundancy character position table.

Incidentally, the first search instruction is, "search the first character string data for a start position of a character string in which the first character is "う" and the second character is "え"". Therefore, the second search instruction becomes, "search the second character string data for a start position of a character string in which the first character is "く" and the second character is "け"" and the third search instruction becomes, "search the third character string data for a start position of a character string in which the first character is "く" and the third character is "け"". The search result obtained when the third character string data "かくきけくすけせこそ" is set as a target at Step S312 is the second character and the fifth character. However, since the even-numbered positions of the third character string data "かくきけく すけせこそ" have the false characters, the search result indicating the second character is eliminated at Step S308, and only the search result indicating the fifth character is adopted. Therefore, the search result in the first character string data for the first search character string becomes (5+1)/2=the third character.

Next, the second concrete example will be described. In the second concrete example as well, at Step S301, the encrypting unit 1104 encrypts the characters of the first character string data one by one by shifting each of the characters by one consonant row of the 50-character kana syllabary, like あ row→か row and か row→さ row, to thereby generate the second character string data. Then, at Step S302, the redundancy unit 1105 uses a table for increasing two characters to four characters, as the redundancy character position table. There are six kinds of patterns as a pattern for increasing two characters to four characters as follows, where (1) and (2) represent authentic characters and ● represents a false character.

first pattern: (1), (2), ●, ●
second pattern: ●, ●, (1), (2)
third pattern: ●, (1), (2), ●
fourth pattern: (1), ●, ●, (2)
fifth pattern: (1), ●, (2), ●
sixth pattern: ●, (1), ●, (2)

It is assumed here that two characters are increased to four characters by using the first, third, and fifth patterns. Therefore, the second character string data is made redundant by the redundancy unit 1105 as follows.

(1), (2), ●, ●, ●, (3), (4), ●, (5), ●, (6), ●

For example, when the first character string data is "あいうえお", the second character string data becomes "かきくけこ". Further, when the first search character string data is "うえ", the second search character string data becomes "くけ". Then, the third character string data obtained by making the second character string data redundant according to the redundancy character position table becomes, for example, "かきくくけく けひこふ". Incidentally, since the second character string data has five characters here, "(6), ●" in the redundancy pattern by the redundancy unit 1105 is eliminated.

The first search instruction becomes, "search the first character string data for a start position of a character string in which the first character is "う" and the second character is "え". Therefore, the second search instruction becomes, "search the second character string data for a start position of a character string in which the first character is "く" and the second character is "け"". Then, the third search instruction becomes the following (a) to (c).

(a): "Search the third character string data for a start position of a character string in which the first character is "け" and the second character is "く"".

(b): "Search the third character string data for a start position of a character string in which the first character is "く" and the third character is "け"".

(c): "Search the third character string data for a start position of a character string in which the first character is "く" and the fifth character is "け"".

At Step S312, the following search results (a) to (c) are obtained for the above third search instructions (a) to (c).

(a): fourth character, sixth character
(b): third character
(c): third character Here, since the redundancy pattern this time is "(1), (2) ●, ●, ●, (3), (4), ●, (5), ●", the third character and the fourth character are eliminated as the false characters, and the sixth character is adopted as the authentic character. Then, at Step S308, the search result converting unit 1107 determines that the sixth character of the third character string data is the third character of the first character string data, by referring to the aforesaid redundancy pattern.

The third concrete example is an example of a character string in each language including Japanese language. In the third concrete example, at Step 301, the encrypting unit 1104 encrypts the characters of the first character string data one by one based on a two-dimensional map of the language of a processing target character string, to thereby generate the second character string data. FIG. 8 is a chart illustrating an example of the two-dimensional map. The two-dimensional map illustrated in FIG. 8 is a map of 5 rows×11 columns corresponding to hiragana characters of Japanese. X represents the row number, y represents the column number, and M(x, y) represents an element of row x and column y.

At Step S301, the encrypting unit 1104 converts the element M(x, y) into an element M(x, y+1) of the same row and the next column to thereby generate the second character string data.

Incidentally, when the element M(x, y+1) is blank, the encrypting unit 1104 scans in a row direction and converts the element M(x, y) into a kana element that it first detects. Consequently, for example, kana "み" is converted into "り". Further, the encrypting unit 1104 converts an element M(x, yend) of the last column into an element M(x, yfirst) of the first column. Consequently, for example, "ん" is converted into "あ".

Incidentally, element positions of the respective characters may be expressed as "A1A2A3A4A5" for "あいうえお" and as "B1B2B3B4B5" for "かきくけこ", by using the columns A to Z and the rows 1 to 5.

The fourth concrete example is an example of a character string of the alphabet. In the fourth concrete example, at Step S301, the encrypting unit 1104 encrypts the characters of the first character string data one by one based on a two-dimensional map of the alphabet illustrated in FIG. 9 to thereby generate the second character string data. FIG. 9 is a chart illustrating an example of the two-dimensional map of the alphabet. The two-dimensional map illustrated in FIG. 9 is a map of 5 rows×11 columns corresponding to totally 52 upper-case and lower-case characters (ABC . . . XYZabc . . . xyz). Element positions of the respective characters are expressed by using the columns A to K and the rows 1 to 5. For example, "ABCDE" is expressed as "A1A2A3A4A5" and "FGHIJ" is expressed as "B1B2B3B4B5".

At Step S301, the encrypting unit 1104 converts an element into an element of the same row and the next column to thereby generate the second character string data. Incidentally, when the element of the next column is blank, the encrypting unit 1104 scans in a row direction and converts the element into an alphabetical element that it first detects. Consequently, for example, alphabet "A" expressed as "A1" is converted into "F" expressed as "B1". Further, for example, "z" expressed as "K2" is converted into "B" expressed as "A2".

As described above, in this embodiment, the numeric data and the character string data can be processed on the mobile terminals 120 while being left encrypted. Therefore, according to this embodiment, it is possible to provide a secure virtual storage without any data leakage from the mobile terminals 120.

Further, in this embodiment, according to security level of the original data (first numeric data, first character string data) designated in advance in the service and reliability of the mobile terminal 120, a period during which the same second numeric data or the third character string data is kept in the same mobile terminal 120 may be decided as within one hour, within one day, within one week, or the like. Then, when the period is exceeded, the second numeric data or the third character string data may be erased in the mobile terminal 120 and the mobile terminal 120 may notify the management server 110 that the second numeric data or the third character string data has been erased. Note that the aforesaid reliability of the mobile terminal 120 is a value decided according to the operating state of the mobile terminal 120 such as the network connection time per day between the mobile terminal 102 and the management server 110, the communication speed of the mobile terminal 102, and the charge state of the mobile terminal 120.

Further, in this embodiment, according to the security level of the original data (first numeric data, first character string data) designated in advance in the service and the reliability of the mobile terminal 120, the number of times the operation instruction for the same second numeric data or third character string data is given may be decided as within once, within 10 times, within 100 times, or the like. Then, when this number of times is exceeded, the management server 110 may be structured not to transmit the operation instruction to the mobile terminal 120. Further, when the permitted number of times the operation instruction is given for the same second numeric data or third character string data is, for example, three times or more, a false operation instruction may be inserted at random intervals such as every time, every four times, every eight times according to the security level of the original data (first numeric data or first character string data) designated in advance.

In this embodiment, due to the arithmetic operation or the search in the encrypted data (second numeric data, third character string data), an increase of a processing amount cannot be avoided, but since the data is operated simultaneously in a distributed manner in the plural mobile terminals 120, the processing time does not increase, and the processing speed close to that of the processing whose target is the data not having undergone the encryption process (first numeric data, first character string data) can be obtained. That is, when the character string data is the processing target, the encryption and the search are performed after the first character string data being the search target is divided, and therefore, parallelism of the processing in the plural mobile terminals 120 can be used. Further, even when the number of patterns of the character string that has to be searched increases due to the encryption process, there occurs no problem if the processing is parallelized by using the plural mobile terminals 120. Further, when the numeric data is the processing target, even if the numeric data being the operation target increases due to the encryption process, the parallelism of the processing in the plural mobile terminals 120 can be used. Further, to make the mobile terminal 120 irregularly perform the false arithmetic operation in addition to the true arithmetic operation does not become a problem if the parallelism of the processing in the plural mobile terminals 120 is utilized.

For example, in the second concrete example where the numeric data is the processing target, since the 99 random numeric data are prepared per first numeric data, a data volume of the second numeric data having undergone the encryption process becomes 100 times as large as a data volume of the first numeric data. However, the individual arithmetic operation for each of the components of the vector is not complicated and the processing time is about equal to that for the first numeric data. To find the sum of a million pieces of the first numeric data, if the second numeric data having been encrypted are processed by the single mobile terminal 120, the arithmetic operation is performed 100 million times, but it is assumed that the 10 mobile terminals 120 perform the division process in a distributed manner, and the single mobile terminal 120 finds the sum of ten thousand pieces of the second numeric data having been encrypted. Consequently, the number of times of the arithmetic operation per mobile terminal 120 is one million times, which means that only the time about equal to the time taken to directly sum the first numeric data is required.

Further, in the third concrete example where the numeric data is the processing target, the exponential function is used for the encryption process of the first numeric data and the arithmetic operation of the encrypted second numeric data is also an exponentiation operation, so that complicatedness of the processing of the encrypted second numeric data increases. However, the number of the second numeric data to be operated and the number of times of the arithmetic operations do not increase due to the encryption. Let us assume a case where, due to the increase of the complicatedness of the processing of the encrypted second numeric data, the time taken for one arithmetic operation in the mobile terminal 120 increases 100 times and the sum of a million pieces of the first numeric data is found. When the encrypted second numeric data are processed by the single mobile terminal 120, the time taken is 100 times, but if the distributed processing is performed by the 100 mobile terminals 120 and the single mobile terminal 120 finds the sum of ten thousand pieces of the encrypted second numeric data, the data processing time in the single mobile terminal 120 becomes one time and the time taken is only about the equal to that when the first numeric data are directly added.

Next, in the first and second concrete examples where the character string data is the processing target, since the false characters are added by using the redundancy character position table at the time of the encryption process of the first character string data, one search condition in the first character string data is sometimes converted into a plurality of search conditions in the third character string data having been encrypted. In the first concrete example, the search condition is only one even after the conversion, but in the second concrete example, it is converted into three search conditions. Further, as for the search result as well, since the false character inserted according to the redundancy character position table is sometimes retrieved, the retrieved false character has to be excluded from the result of the search executed by the mobile terminal 120. In the first concrete example, one is excluded, and in the second concrete example, two are excluded. Regarding this exclusion, since this is processing for the search result and its load is greatly lighter as compared with a search process in large character string data, and therefore the load can be neglected. Let us assume a case where, as a result of the encryption, the number of characters of the character string data becomes two times and the number of the search conditions after the conversion increases 100 times, and the search is performed once in the first character string data having million characters. When the single mobile terminal 120 processes the encrypted data, the time taken is about 200 times, but if the distributed processing is performed by the 200 mobile terminals 120 and the single mobile terminal 120 finds one search condition corresponding to one million characters out of the two million encrypted characters, the time taken for the single mobile terminal 120 to process the data is one time, that is, about equal to the time taken to directly search the first character string data.

Next, the retrieval process of the divided storage target data and the restore process of the divided storage target data in the data storage system according to this embodiment will be described with reference to FIG. 10.

At Step S401, the transmitting unit 1108 of the management server 110 transmits a data retrieval request to each of the mobile terminals 120 where the divided storage target data is made to store according to a request from the DC provider server 130. At Step S411, the mobile terminals 120 each receive the data retrieval request from the management server 110. At Step S412, the mobile terminals 120 each read the divided storage target data from the recording medium 1201 and transmit it to the management server 110. At Step S402, the receiving unit 1109 of the management server 110 receives the divided storage target data from each of the plural mobile terminals 120. Then, the validity assessing unit 1110 confirms their sameness. At Step S403, the decrypting unit 1111 of the management server 110 decrypts each of the divided storage target data. At Step S404, the integrating unit 1112 of the management server 110 integrates the plural divided storage target data to restore the storage target data.

As described above, in this embodiment, the plural divided storage target data are encrypted, and regarding each of the encrypted divided storage target data, the same divided storage target data is made to store in the plural mobile terminals 120. Consequently, information leakage from the mobile terminals 120 is prevented to the minimum, and the redundancy is given to the divided storage target data which is to be stored, in case a communication state of the wireless communication used by the mobile terminals is not stable. Therefore, according to this embodiment, it is possible to provide a secure virtual storage using the mobile terminals 120.

Figure 11:
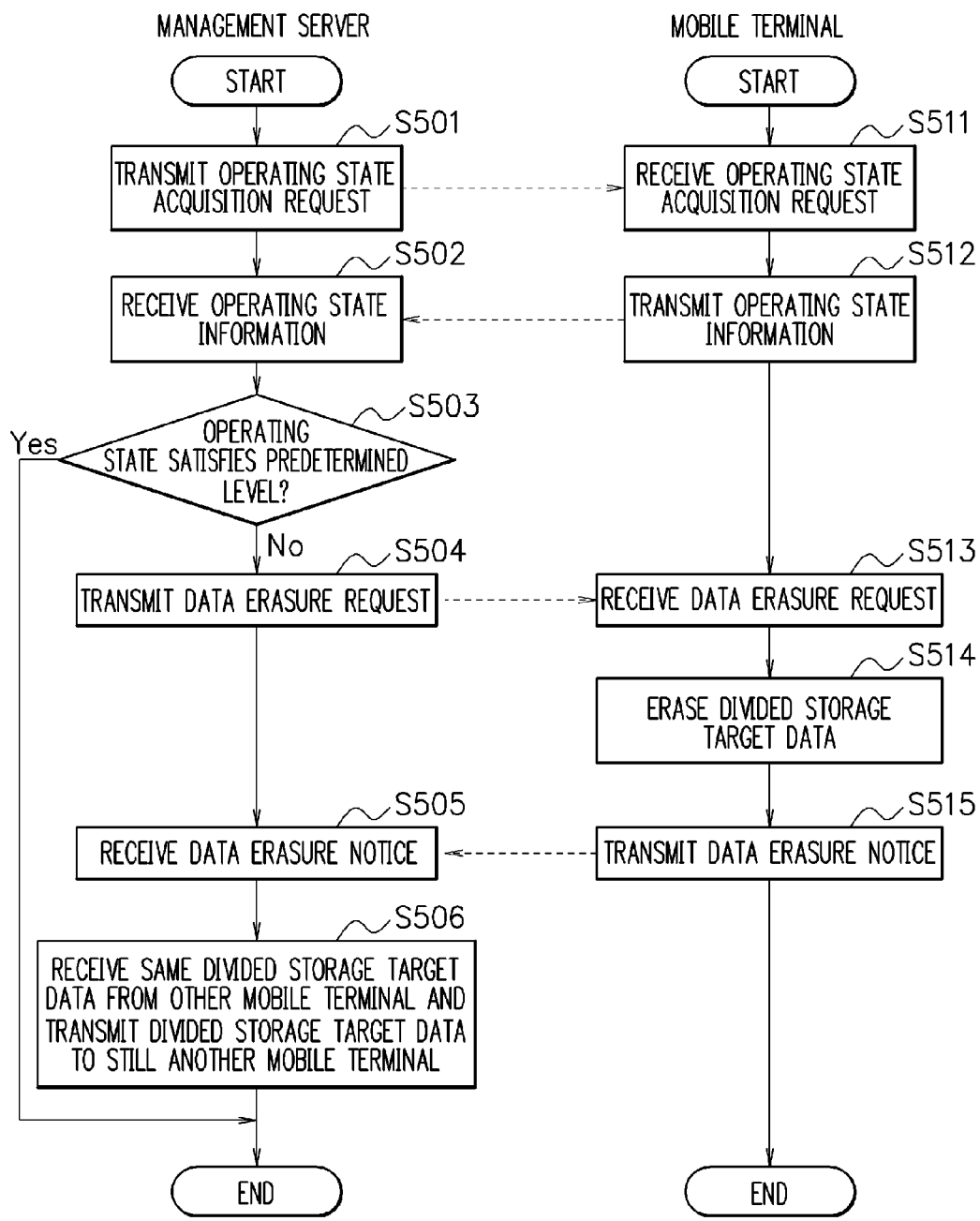
FIG. 11 is a flowchart illustrating processing by a terminal operating state managing unit of the management server.

Next, the processing by the terminal operating state managing unit 1113 of the management server 110 in this embodiment will be described with reference to FIG. 11. The processing described here is processing repeatedly executed at regular intervals after the processing illustrated in FIG. 3 is already executed and the divided storage target data is stored in each of the mobile terminals 120.

At Step S501, the terminal operating state managing unit 113 of the management server 110 issues an operating state acquisition request to each of the mobile terminals 120 where the divided storage target data is stored. The operating state acquisition request is transmitted to the mobile terminals 120 via the transmitting unit 1108. At Step S511, the mobile terminals 120 each receive the operating state acquisition request from the management server 110. At Step S512, the transmitting unit 1108 of each of the mobile terminals 120 transmits, to the management server 110, the operating state information indicating the own operating state (the communication state (the communication speed, the network connection time per day), the battery charge state, the load of CPU, and so on). Incidentally, at Step S501, the operating state acquisition request is issued even to the mobile terminal 120 which has not yet stored the divided storage target data. This is done in order to select the mobile terminal 120 that can be a storage of the divided storage target data in the future.

At Step S502, the receiving unit 1109 of the management server 110 receives the operating state information from each of the mobile terminals 120. At Step S503, the terminal operating state managing unit 1113 of the management server 110 monitors the operating state of each of the mobile terminals 120 storing the divided storage target data, based on the operating state information. Concretely, the terminal operating state managing unit 1113 determines, for each of the mobile terminals 120 storing the divided storage target data, whether or not the operating state of the mobile terminal 120 satisfies a predetermined level, based on the operating state information. The predetermined level mentioned here is a level of the communication state, the battery charge state, the load of the CPU, or the like enabling the mobile terminal 120 to surely transmit the stored divided storage target data to the management server 110.

When the operating state of the mobile terminal 120 satisfies the predetermined level, the terminal operating state managing unit 1113 ends the processing. On the other hand, when the operating state of the mobile terminal 120 does not satisfy the predetermined level, the terminal operating state managing unit 1113 advances the processing to Step S504. At Step S504, the terminal operating state managing unit 1113 of the management server 110 issues a data erasure request to the relevant mobile terminal 120, and the transmitting unit 1108 transmits the data erasure request to the mobile terminal 120. At Step S513, the mobile terminal 120 receives the data erasure request from the management server 110.

At Step S514, the mobile terminal 120 erases the stored divided storage target data from the recording medium. At Step S515, the mobile terminal 120 transmits a data erasure notice to the management server 110. At Step S505, the receiving unit 1109 of the management server 110 receives the data erasure notice from the mobile terminal 120.

At Step S506, the terminal operating state managing unit 1113 of the management server 110 receives the divided storage target data from another one of the mobile terminals 120 storing the same divided storage target data as that stored by the mobile terminal 120 which has issued the aforesaid data erasure notice. Then, the terminal operating state managing unit 113 transmits the received divided storage target data to still another one of the mobile terminals 120 via the transmitting unit 1108.

As described above, in this embodiment, the operating state of each of the mobile terminals 120 storing the divided storage target data is monitored, and when the monitoring result turns out that the mobile terminal 120 whose operating state has a risk of disabling the retrieval of the divided storage target data exists, the divided storage target data is erased from the relevant mobile terminal 120, and the other mobile terminal 120 is made to store the divided storage target data, whereby the relocation of the divided storage target data is performed. Consequently, it is possible to avoid a risk such as that the divided storage target data cannot be erased in the mobile terminal 120 whose operating state has worsened and is stealthily peeked by a malicious person, and also it is possible to surely retrieve all the divided storage target data irrespective of the operating state of the mobile terminals 120 storing the divided storage target data. Further, the mobile terminal 120 is sometimes in an operating state that does not allow the retrieval of the divided storage target data, due to a poor communication state, and in such a case, it is preferable to erase the divided storage target data without waiting for the issuance of the data erasure request from the management server 110, depending on a continuous or intermittent communication interruption time condition instructed from the management server 110 in advance. In this case, the management server 110 deems that the divided storage target data stored in the mobile terminal 120 has been erased when it cannot communicate with the mobile terminal 120 for a period corresponding to the communication interruption time condition instructed to the mobile terminal 120 in advance, and makes the other mobile terminal 120 store the same divided storage target data.

As described above, in this embodiment, after the divided storage target data is erased from the mobile terminal whose operating state does not satisfy the predetermined level, the same divided storage target data is obtained from the other mobile terminal. As another possible embodiment, when the mobile terminal whose operating state does not satisfy the predetermined level is detected, the same divided storage target data as the divided storage target data stored in the relevant mobile terminal is first obtained from the other mobile terminal, and thereafter, the divided storage target data is erased from the aforesaid mobile terminal whose operating state does not satisfy the predetermined level. This makes it possible to avoid a situation where, after the storage target data is erased from the mobile terminal, the same data as this divided storage target data cannot be obtained.

Incidentally, in the above-described embodiment, the management server 110 performs the encryption process allowing the search in the encrypted divided storage target data, as described with reference to FIG. 6 and FIG. 7, but the encryption process is not limited to that in this embodiment. Specifically, when an arithmetic operation of a numeric value or a search in a character string is not aimed, the management server 110 may perform an encryption process not allowing the search. In this case, it is possible to enhance security of data while it is stored, and owing to the redundancy of the data, it is possible to surely retrieve the storage target data. Further, the encryption process in this case may be performed by the mobile terminal 120 instead of the management server 110. In this case, it is preferable that the mobile terminal 120 encrypts the divided storage target data which has not been encrypted and stores it in the recording medium, immediately after receiving it from the management server 110.

Further, in the above-described embodiment, the management server 110 applies the encryption process to the numeric value or the character string of the divided storage target data as described with reference to FIG. 6 and FIG. 7, but the management server 110 may apply the encryption process described with reference to FIG. 6 and so on to the storage target data without dividing the storage target data. In this case, the management server 110 is capable of realizing the arithmetic operation of or the search in the encrypted storage target data.

This embodiment can be realized by a computer executing a program. Further, a computer-readable recording medium in which the aforesaid program is recorded and a computer program product such as the aforesaid program is also applicable as an embodiment of the present invention. As the recording medium, for example, a flexible disk, a hard disk, an optical disk, a magneto-optic disk, CD-ROM, a magnetic tape, a nonvolatile memory card, ROM, and the like are usable.

It should be noted that the above-described embodiments all only present concrete examples in carrying out the present invention, and the technical scope of the present invention should not be construed in a limited manner by these. That is, the present invention can be embodied in various forms without departing from its technical idea or its main features.

INDUSTRIAL APPLICABILITY

According to the present invention, it is possible to provide a secure virtual storage utilizing mobile terminal devices.

The invention claimed is:

1. An information processing apparatus communicably connected to a mobile terminal device, the information processing apparatus comprising:
   an encrypting unit configured to encrypt storage target data;
   a transmitting unit configured to transmit the encrypted storage target data encrypted by the encrypting unit to the mobile terminal device;
   a receiving unit configured to receive the encrypted storage target data stored in the mobile terminal device; and
   a decryption unit configured to decrypt the encrypted storage target data received by the receiving unit, wherein:
   the receiving unit is further configured to receive information indicating a communication state of the mobile terminal device from the mobile terminal device;
   a managing unit configured to monitor an operating state of the mobile terminal device, and to erase encrypted storage target data stored in the mobile terminal device to be erased,
      wherein according to a result of the monitoring, causing the encrypted storage target data stored in the mobile terminal device to be erased; and
   a converting unit configured to convert the result of a second process into a result of a first process for the storage target data;
      wherein the converting unit converts a result of a second arithmetic process being the second process for the encrypted storage target data, into a result of a first arithmetic process being the first process for the storage target data, by using an inverse function of the encryption function; and the transmitting unit is further configured to transmit a data erasure request of the storage target data stored in the mobile terminal device to the mobile terminal device, when the communication state does not satisfy a predetermined level.

2. The information processing apparatus according to claim 1, wherein the transmitting unit is further configured to transmit the same encrypted storage target data to a plurality of terminal devices including the mobile terminal device.

3. The information processing apparatus according to claim 1, further comprising:
a dividing unit configured to divide the storage target data, wherein:
the encrypting unit is further configured to encrypt each divided storage target data generated by a division process by the dividing unit; and
the transmitting unit is further configured to transmit the divided encrypted storage target data encrypted by the encrypting unit to the mobile terminal device.

4. The information processing apparatus according to claim 3, wherein the transmitting unit is further configured to transmit each of the divided encrypted storage target data encrypted by the encrypting unit to a plurality of terminal devices including the mobile terminal device different from each other.

5. The information processing apparatus according to claim 3, wherein the dividing unit is further configured to divide the storage target data so that a ratio of a size of the divided storage target data to a size of the storage target data becomes a predetermined ratio or less.

6. The information processing apparatus according to claim 3, further comprising:
an assessing unit configured to assess validity of the divided encrypted storage target data received by the receiving unit from the mobile terminal device; and
an integrating unit configured to integrate the divided encrypted storage target data whose validity is confirmed by the assessing unit to restore the storage target data.

7. The information processing apparatus according to claim 2, wherein:
when the transmitting unit transmits the data erasure request to the mobile terminal device, the receiving unit receives the same encrypted storage target data as the encrypted storage target data stored in the mobile terminal device from a second mobile terminal device, and
the transmitting unit transmits the encrypted storage target data received from the second mobile terminal device to a third mobile terminal device.

8. The information processing apparatus according to claim 1, wherein:
the transmitting unit transmits, to the mobile terminal device, the encrypted storage target data and an instruction of the second process for the encrypted storage target data, the second process corresponding to the first process for the storage target data; and
the receiving unit receives a result of the second process for the encrypted storage target data, from the mobile terminal device.

9. The information processing apparatus according to claim 8, wherein:
the encrypting unit encrypts the storage target data by adding data to the encrypted storage target data based on a pattern; and the converting unit converts a result of a second search process being the second process for the encrypted storage target data into a result of a first search process being the first process for the storage data, based on the pattern.

10. A control method of an information processing apparatus communicably connected to a mobile terminal device, the control method comprising:
an encrypting step of encrypting storage target data;
a transmitting step of transmitting the encrypted storage target data encrypted by the encrypting step to the mobile terminal device;
a receiving step of receiving the encrypted storage target data stored in the mobile terminal device;
a decrypting step of decrypting the encrypted storage target data received by the receiving step;
a receiving step of receiving information indicating a communication state of the mobile terminal device from the mobile terminal device;
a managing step of monitoring an operating state of the mobile terminal device, and to erase encrypted storage target data stored in the mobile terminal device to be erased,
wherein according to a result of the monitoring, causing the encrypted storage target data stored in the mobile terminal device to be erased; and
a converting step of converting the result of a second process into a result of a first process for the storage target data;
wherein the converting step converts a result of a second arithmetic processing being the second process for the encrypted storage target data, into a result of a first arithmetic processing being the first process for a the storage target data, by using an inverse function of the encryption function; and
a transmitting step of transmitting a data erasure request of the storage target data stored in the mobile terminal device to the mobile terminal device, when the communication state does not satisfy a predetermined level.

11. A computer readable non-transitory recording medium with program for controlling an information processing apparatus communicably connected to a mobile terminal device to execute:
an encrypting step of encrypting storage target data;
a transmitting step of transmitting the encrypted storage target data encrypted by the encrypting step to the mobile terminal device;
a receiving step of receiving the encrypted storage target data stored in the mobile terminal device;
a decrypting step of decrypting the encrypted storage target data received by the receiving step;
a receiving step of receiving information indicating a communication state of the mobile terminal device from the mobile terminal device;
a managing step of monitoring an operating state of the mobile terminal device, and to erase encrypted storage target data stored in the mobile terminal device to be erased,
wherein according to a result of the monitoring, causing the encrypted storage target data stored in the mobile terminal device to be erased; and
a converting step of converting the result of a second process into a result of a first process for the storage target data;
wherein the converting step converts a result of a second arithmetic processing being the second process for the encrypted storage target data, into a result of a first arithmetic processing being the first process for a the storage target data, by using an inverse function of the encryption function; and a transmitting step of transmitting a data erasure request of the storage target data stored in the mobile terminal device to the mobile terminal device, when the communication state does not satisfy a predetermined level.

* * * * *